United States Patent [19]
Yokouchi

[11] Patent Number: 5,802,332
[45] Date of Patent: Sep. 1, 1998

[54] SINGLE-CHIP MICROCOMPUTER AND ELECTRONIC DEVICE USING THE SAME

[75] Inventor: Hideaki Yokouchi, Suwa, Japan

[73] Assignee: Seiko Epson Corporation, Tokyo, Japan

[21] Appl. No.: 706,233

[22] Filed: Sep. 4, 1996

[30] Foreign Application Priority Data

Sep. 6, 1995 [JP] Japan ................... 7-229537
Aug. 19, 1996 [JP] Japan ................... 8-235894

[51] Int. Cl.⁶ .................. G06F 13/40; G06F 9/40
[52] U.S. Cl. ............. 395/311; 395/280; 364/DIG. 1; 364/DIG. 2
[58] Field of Search ................ 395/570, 750.05, 395/186, 740, 735, 307, 823, 800.03, 800.22, 555, 311, 558, 280, 800.34, 651, 800.37, 733, 80.29; 364/DIG. 1, DIG. 2, 706; 84/622; 711/712

[56] References Cited

U.S. PATENT DOCUMENTS

| | | | |
|---|---|---|---|
| 4,407,016 | 9/1983 | Bayliss et al. | 395/823 |
| 4,450,524 | 5/1984 | Oberman | 711/712 |
| 5,376,752 | 12/1994 | Limberis et al. | 84/622 |
| 5,680,581 | 10/1997 | Banno et al. | 595/480 |

*Primary Examiner*—Daniel H. Pan
*Attorney, Agent, or Firm*—Oliff & Berridge

[57] ABSTRACT

A single-chip microcomputer and electronic device using the same are ideally adapted for an electronic notebook, electronic dictionary and the like with a reduced overall system power consumption. The single-chip microcomputer to which are connected externally connected devices any one of which can be selected by a chip select signal executes program instructions. The single-chip microcomputer has a chip select signal output terminal which makes active and outputs a chip select signal selecting one of the externally connected devices. The single-chip microcomputer further has standby state setting means which outputs a standby state setting signal temporarily halting the execution of program instructions and control means for changing said chip select signal which is active to be inactive based on the standby state setting signal from the standby state setting means.

13 Claims, 10 Drawing Sheets

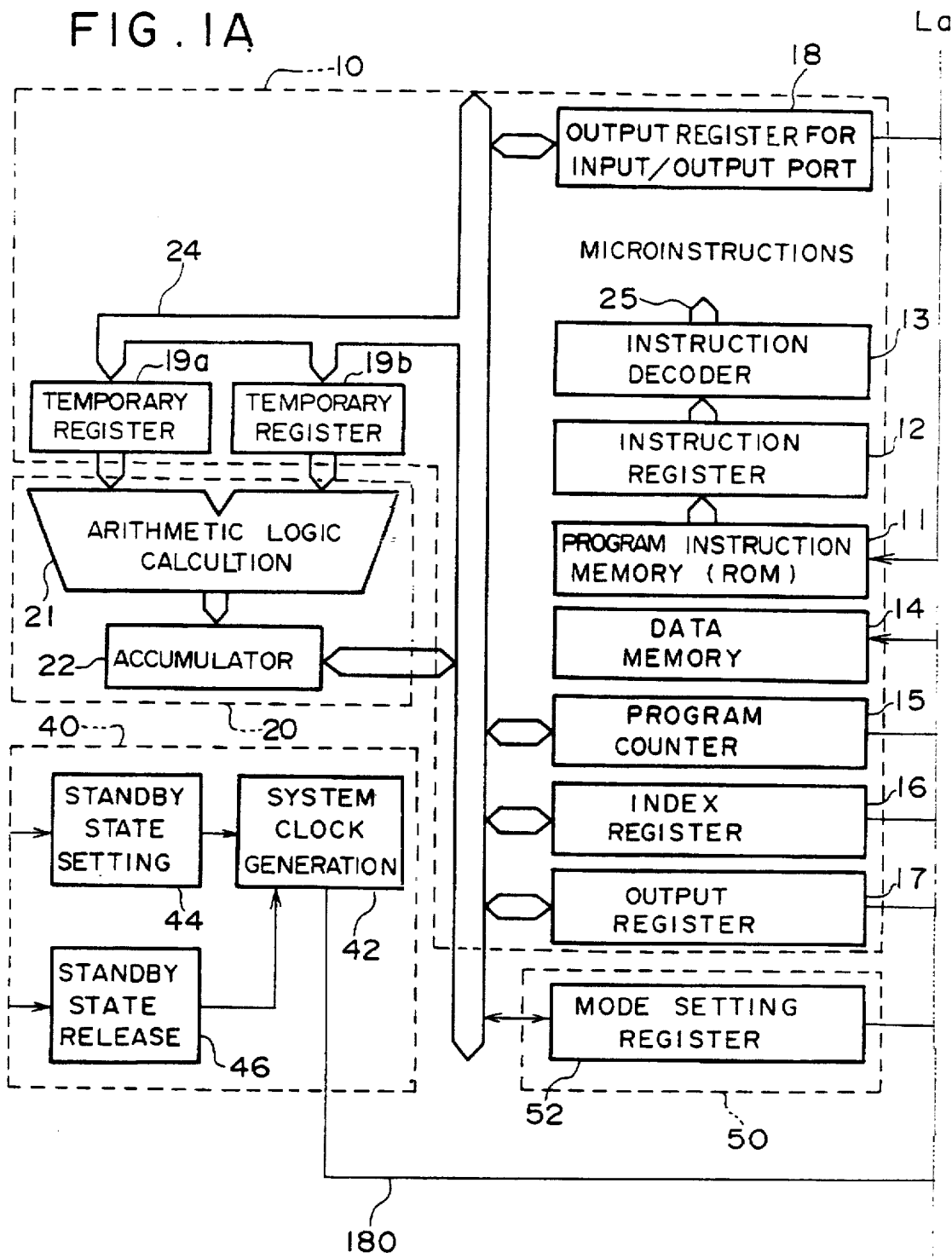

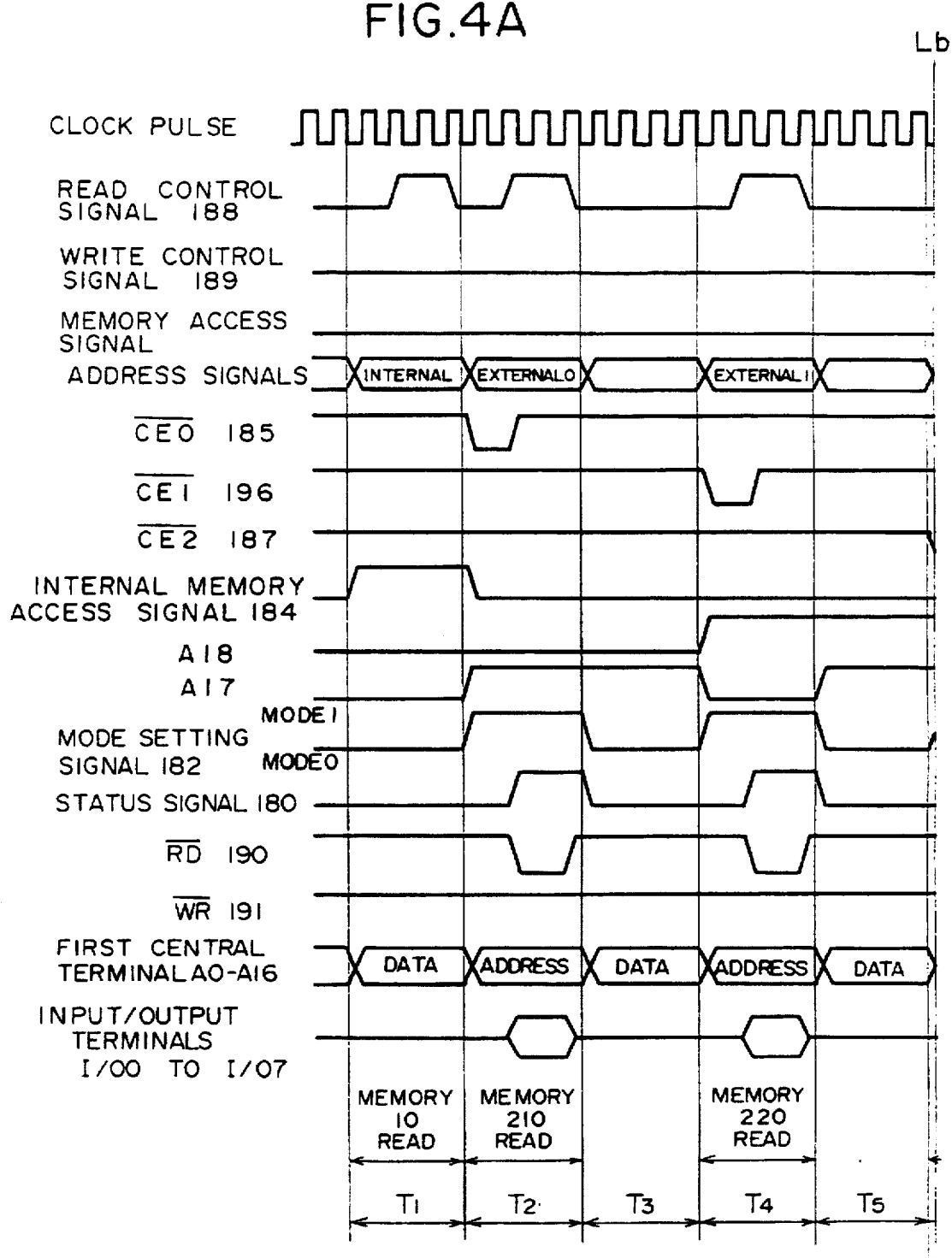

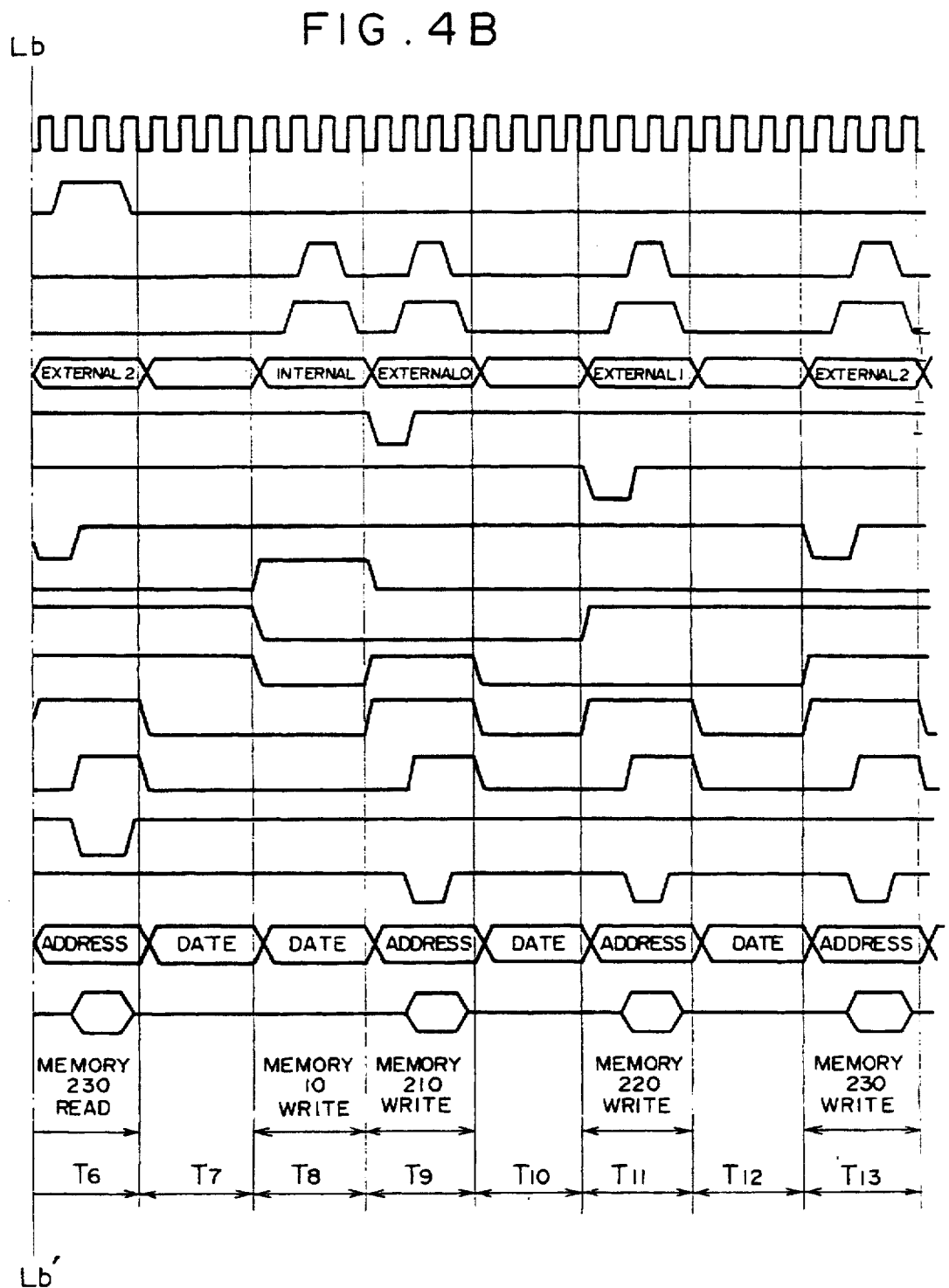

SINGLE-CHIP MICROCOMPUTER AND ELECTRONIC DEVICE USING THE SAME

BACKGROUND OF THE INVENTION

1. Field of the Invention

The present invention relates to a single-chip microcomputer and electronic device using the same.

2. Related Art

Generally, in this type of microcomputer to which external memory is connected, a plurality of external memory devices are provided. One of corresponding chip enable signals is made active and is output from an output terminal of the microcomputer to select an external memory device. Then, while the external memory is selected, the address is specified with respect to the external memory device.

More specifically, based on the logic of a set of highest order bits of the memory address, one of a plurality of chip enable signals supplied to the plurality of external memory devices is made active, and the address signals are supplied to the addressing region of the desired external memory device. While this address specification is in effect (while the external memory device is selected), the active chip enable signal is output from the output terminals of the microcomputer, whereby the external memory device is accessed.

From the viewpoint of reducing power consumption, it is general to stop the CPU clock, and pause execution of program instructions with the system in a standby state.

However, for the above device, when the memory address signals are supplied from the CPU to the addressing region of the external memory device, even if the CPU is on standby, the active chip enable signal is output. Thus the sense amplifier and other components in the external memory device remain in the operating state. As a result, since the ROM, RAM, or other external memory device remains in the operating state, an internal current continues to flow in the external device, and there is the problem that the overall current consumption of the system is increased.

There is a device in which program instructions are stored in both internal and external memory, and a function is provided for selective execution of program instructions stored in either of the two memories.

However, for such a device, even if a program is executed based on the program instructions stored in the external memory, since the memory address signals output from the CPU specify the external memory addressing region, the external memory device remains enabled. As a result, as described above, the overall current consumption of the system is increased, and there is the problem of a lack of ability to be adapted for use in a portable device or the like which require battery operation.

To solve the above problem the method can be conceived in which instead of executing instructions in the external memory, a temporary branch is made to a program in internal memory, and program instructions executed. In this method, however, there are problems, such as that the software overheads are large and, that debugging is difficult.

Furthermore, for a general device of this type, the memory addressing signals for memory access are output to the outside through special-purpose terminals. As a result, the terminals for the memory addressing signals are used only for controlling external memory, and when used in combination with another system, it is necessary to provide another set of output terminals separate from the memory address terminals. As a result of this, not only is the number of terminals increased, but also the chip size is increased, with a consequent danger of increased cost.

SUMMARY OF THE INVENTION

The present invention addresses the above-described problem with the prior art and has as its object the solution thereof by means of the provision of a single-chip microcomputer and electronic device using the same. It is possible to prevent the flowing of a current in the external memory device even while the CPU is on standby, and thus accomplish a reduction in the power consumption.

Another object of the present invention is the provision of a single-chip microcomputer and electronic device using the same in which even if program instructions or the like in external memory are executed, the increase in the system current consumption is restricted, and which is suited to application to an electronic notebook, electronic dictionary, or the like.

A further object of the present invention is the provision of a single-chip microcomputer and electronic device using the same which is suited to combination with another system, and in which the increase in the number of terminals is restricted.

The single-chip microcomputer of the present invention to which is connected a plurality of externally connected devices any one of which can be selected by a chip select signal executes program instructions, comprising:

a chip select signal output terminal which makes active and outputs a chip select signal selecting one of the plurality of externally connected devices;

standby state setting means for outputting a standby state setting signal to temporarily halt the execution of the program instructions; and control means for changing the active chip select signal to be inactive based on the standby state setting signal from the standby state setting means, while the execution of the program instructions is halted temporarily.

According to the present invention, the following efficacies are obtained.

(1) By means of the control means, when the single-chip microcomputer is on standby, chip select signals are always inactive. For this reason, with the externally connected devices disabled, no internal current flows, and the overall power consumption of the system can be reduced.

(2) Whether the single-chip microcomputer is executing an instruction stored in internal memory, or whether executing an instruction stored in an externally connected device, when on standby the externally connected device can be disabled. As a result, the overall current consumption of the system can be reduced. When, therefore, applied to a portable device or the like requiring battery operation, the battery operating lifetime can be lengthened, or the electronic device made more compact by reducing the number of batteries.

Moreover, since program instructions can be stored in an externally connected device and control carried out on the basis of these program instructions, without the need to provide branches of CPU control to program instructions in the internal memory, the software overhead is reduced and software debugging is made simpler. It should be noted that the externally connected devices may equally be for example memory or display devices.

According to the present invention, the plurality of externally connected devices are a plurality of external memory devices, the single-ship microcomputer further comprising:

a memory address signal output terminal outputting a memory address signal supplied to one of the plurality of external memory devices selected by the chip select signal; and an input and output terminal inputting and outputting a memory data signal to the one of the external memory devices according to the memory address signal from the memory address signal output terminal.

According to the present invention, by virtue of the plurality of externally connected devices being a plurality of external memory devices, the memory addressing region can be increased and the memory capacity increased. In addition, since program instructions can be stored the software overhead can be positively reduced.

According to another aspect of the present invention, the single-chip microcomputer to which is connected first externally connected devices and at least one second externally connected device supplies an address signal to one of the first externally connected devices selected by a chip select signal in accordance with the execution of program instructions, the single-ship microcomputer supplying a data signal to the at least one second externally connected device, comprising:

a first output terminal selectively outputting either of the address signal and the data signal;

a second output terminal making active and outputting a chip select signal which selects one of the first externally connected devices;

standby state setting means for outputting a standby state setting signal to temporarily halt the execution of the program instructions;

mode setting means for outputting a mode setting signal to establish either of a first mode in which the address signal is output from the first output terminal and a second mode in which the data signal is output from the first output terminal;

first control means for controlling the output of one of the address signal and the data signal from the first output terminal based on the mode setting signal from the mode setting means; and second control means for changing the chip select signal output from the second output terminal to be inactive based on the standby state setting signal from the standby state setting means, while the execution of the program instructions is halted temporarily.

According to the present invention, the following efficacies are obtained.

(1) By means of the second control means, when the single-chip microcomputer is on standby, chip select signals are always inactive. For this reason, with the first externally connected devices disabled, no internal current flows within the externally connected devices, and the power consumption of the system can be reduced.

Specifically, when an address of the first externally connected devices is specified, a chip select signal is made active and output from the second output terminal, and an address signal is output from the first output terminal.

When the standby state is established by the standby state setting means, a chip select signal which is active is made inactive by the second control means.

The above operation is executed as the first mode, a switch to the second mode is made by the mode setting means, and a data signal from the first output terminal is supplied toward at least one second externally connected device.

As a result, at the time of the address signal output carried out in the first mode, no current flows in the first externally connected devices, and the power consumption of the system can be reduced.

(2) By means of the mode setting means, a mode setting signal is set to either one of a first mode or a second mode, whereby address or data signals can be output selectively from the first output terminals for address signals.

Specifically, when the mode setting signal is set to the first mode, access to the first externally connected devices is possible. Nevertheless, when the mode setting signal is set to the second mode, access to the first externally connected devices is inhibited. By distinguishing the two in this way, when the second mode is established, it is data signals which appear on the first output terminals, and not address signals. In the second mode access to the first externally connected devices is inhibited, data signals are supplied to the second externally connected devices, and misoperations such as the incorrect supply of the data signals to the first external connection terminals are prevented.

In this way, by using the first output terminal for both address signal and data signal, the number of terminals is reduced, and the device can be made more compact.

According to the present invention, the second control means the second control means comprises:

first gate means for making active and outputting the chip select signal in the first mode based on a set of highest order bits of the address signal and the mode setting signal; and second gate means for inputting the output of the first gate means and making the active ship select signal output from the second output terminal inactive based on the standby state setting signal from the standby state setting means, while the execution of the program instructions is halted temporarily.

According to the present invention, by means of the first gate means any of the first externally connected devices can be selected. Moreover, after selection, based on the status signal, in the second gate means, the active chip select signal output can be forcibly made inactive.

Moreover, in the present invention, the mode setting means establishes alternately and cyclically the first mode and the second mode.

According to the present invention, the access time to the first externally connected devices is short, but for an operation of the second externally connected devices for example a manual key press, the time is significantly long in terms of the processing speed of the single-chip microcomputer. Therefore, even while processing signals of the first externally connected devices, it is possible to switch to the second mode, and carry out input processing for the second externally connected devices. As a result, by switching the mode setting signal alternately and cyclically between the first mode and the second mode, with memory access to the first externally connected devices and processing with respect to the second externally connected devices carried out in parallel, there will in practice be absolutely no problem.

Moreover, in the present invention, the at least one second externally connected device includes a key matrix; and the key matrix carries out key input processing in the second mode based on the data signal output from the first output terminal.

According to the present invention, in the second mode, data signal is output from the first output terminal. By means of this data signal, the key matrix is scanned, and a key input is captured through the input terminal, whereby the key matrix is put into the operating state. By carrying this out in the second mode, it is possible to carry out data input to the system.

Moreover, in the present invention, at least one of the first externally connected device is an external memory device, the single-ship microcomputer further comprising an input and output terminal inputting and outputting a memory data signal to and from the external memory device according to the memory address signal from the memory address signal output terminal.

According to the present invention, by the provision of the at least one of the first externally connected device as an external memory device, the memory addressing region can be increased and the memory capacity increased. In addition, since program instructions can be stored the software overhead can be positively reduced.

Moreover, the single-chip microcomputer of the present invention further comprises third output terminals which outputs read and write signals to the first externally connected devices when the first mode is established by the mode setting signal; and third control means for blocking the output of the read and write signals from the third output terminals when the second mode is established by the mode setting signal.

According to the present invention, in the second mode, the third control means can prevent output of the write signal and read signal. Therefore, when outputting data signal to the second external memory devices, read and write operations do not occur. Additionally, only when address signal is output from the first output terminal, reading and writing are performed, and events such as the reading of incorrect data from the first externally connected devices or writing of incorrect data to the first externally connected devices do not occur. Further, in the first mode, by means of the output of a read signal or write signal from the third output terminals, reading or writing with respect to the first externally connected devices can be carried out through the input and output terminal.

Moreover, in the present invention, the third output terminals comprise a fourth output terminal outputting the read signal to the first externally connected devices when the first mode is established by the mode setting signal and a fifth output terminal outputting the write signal to the first externally connected devices when the first mode is established by the mode setting signal;

the second control means further comprises a gate control signal generating means for generating a gate control signal which blocks the output of one of the read signal output from the fourth output terminal and the write signal output from the fifth output terminal based on the mode setting signal when the second mode is established; and the third control means comprises:
first gate means for blocking the output of the read signal output from the fourth output terminal based on the gate control signal; and
second gate means for blocking the output of the write signal output from the fifth output terminal based on the gate control signal.

According to the present invention, the output of the read signal can be adjusted by means of the first gate means, by controlling the gate control signal which influences the mode setting signal. Specifically, in the first mode the read signal is output and reading from the first externally connected devices is carried out, while in the second mode output of the read signal is inhibited and reading is stopped.

Similarly, the output of the write signal can be adjusted by means of the second gate means, by controlling the gate control signal which influences the mode setting signal. Specifically, in the first mode the write signal is output, and writing to the first externally connected devices is carried out, while in the second mode output of the write signal is inhibited and writing is stopped.

Moreover, the single-chip microcomputer of the present invention further comprises microinstruction generating means for sequentially outputting microinstructions based on the program instructions wherein the standby state setting means comprises signal generating means for generating the standby state setting signal based on the microinstructions.

According to the present invention, by means of microinstructions generated by the microinstruction generating means, when a standby state setting signal is made active, and the single-chip microcomputer is put into the standby state, a chip select signal can be made inactive.

According to another aspect of the present invention, the single-chip microcomputer to which are connected at least one external memory, at least one key matrix, and at least one display means supplies a memory address signal to the at least one external memory and carries out read and write control of a memory data signal in accordance with the execution of program instructions, the single-chip microcomputer supplying a key scan signal to the at least one key matrix to control key input processing, the single-chip microcomputer supplying a data display signal to the at least one display means to control data display, comprising:

a first output terminal selectively outputting one of the memory address signal, the key scan data signal, and the display data signal;

an input and output terminal inputting and outputting the memory data signal to and from the at least one external memory device;

an output register storing one of the key scan data signal and the display data signal output from the first output terminal;

an input and output register storing the memory data signal input and output from the input and output terminal;

address generation means for generating the memory address signal;

a second output terminal making active and outputting a chip select signal which selects one of the at least one external memory and the at least one display means;

standby state setting means for outputting a standby state setting signal to temporarily halt the execution of the program instructions;

mode setting means for outputting a mode setting signal to establish either of a first mode in which the memory address signal is output from the first output terminal and a second mode in which either of the key scan signal and the display signal is output from the first output terminal;

first control means for controlling the output from the first output terminal of the memory address signal generated by the address generation means based on the mode setting signal in the first mode and the output from the first output terminal of either of the key scan signal and the display signal stored in the output register in the second mode; and second control means for changing the chip select signal output from the second output terminal to be inactive based on the standby state setting signal from the standby state setting means, while the execution of the program instructions is halted temporarily.

According to the present invention, the following efficacies are obtained.

(1) By means of an active operation of a chip select signal, display means can be activated and data signals indicating the results of calculation processing or the like can be displayed. When this display is carried out, since the chip select signal can be made inactive by the second control means, a wasteful current flow within the display means can be prevented, and the overall system power consumption can be reduced.

(2) The access time to external memory is short, but the time of a human key press is significantly long in terms of the processing speed of the single-chip microcomputer. As a result, by switching the mode setting signal cyclically between the first mode and the second mode, and carrying out memory access and key processing in parallel, there will in practice be absolutely no problem.

More specifically, in the second mode, key scan signal are output from the first output terminal. By means of these key scan signals, the key matrix is scanned, and a key input is captured through the input terminal, whereby the key matrix is put into the operating state.

After carrying out key input processing in the second mode by virtue of program instructions, in order to access the external memory, the process of searching for second data signals and the like stored in external memory should be started, and the mode setting means should be set to the first mode. Then, when the mode setting means is set to the first mode, access to the external memory becomes possible, and in addition to searching for data, other processing such as saving information or sorting is possible. At this time, it is not possible to accept input data from the key matrix, but normally if sampling for manual key input is carried out once every 30 to 50 milliseconds no input will fail to be accepted. Therefore, even when processing of second data signals of the external memory is carried out through the input and output terminal if the mode setting means is switched to the second mode every 30 to 50 milliseconds and key input processing carried out, it will be possible to continue processing without any key inputs being lost.

The electronic device according to the present invention is an electronic device using the single-chip microcomputer described above.

As a result, by using the above-described single-chip microcomputer, a reduction in power consumption can be obtained.

BRIEF DESCRIPTION OF THE DRAWINGS

FIGS. 1A and 1B are block diagrams showing a part of the configuration of a single-chip microcomputer according to the present invention.

FIGS. 4A and 4B are timing charts illustrating the operation of the single-chip microcomputer according to the present invention.

PREFERRED EMBODIMENTS OF THE INVENTION

The present invention is now described in terms of a number of preferred embodiments, with reference to the drawings.

First Embodiment 1-1. Basic Configuration of the Single-Chip Microcomputer

Figure 1B:
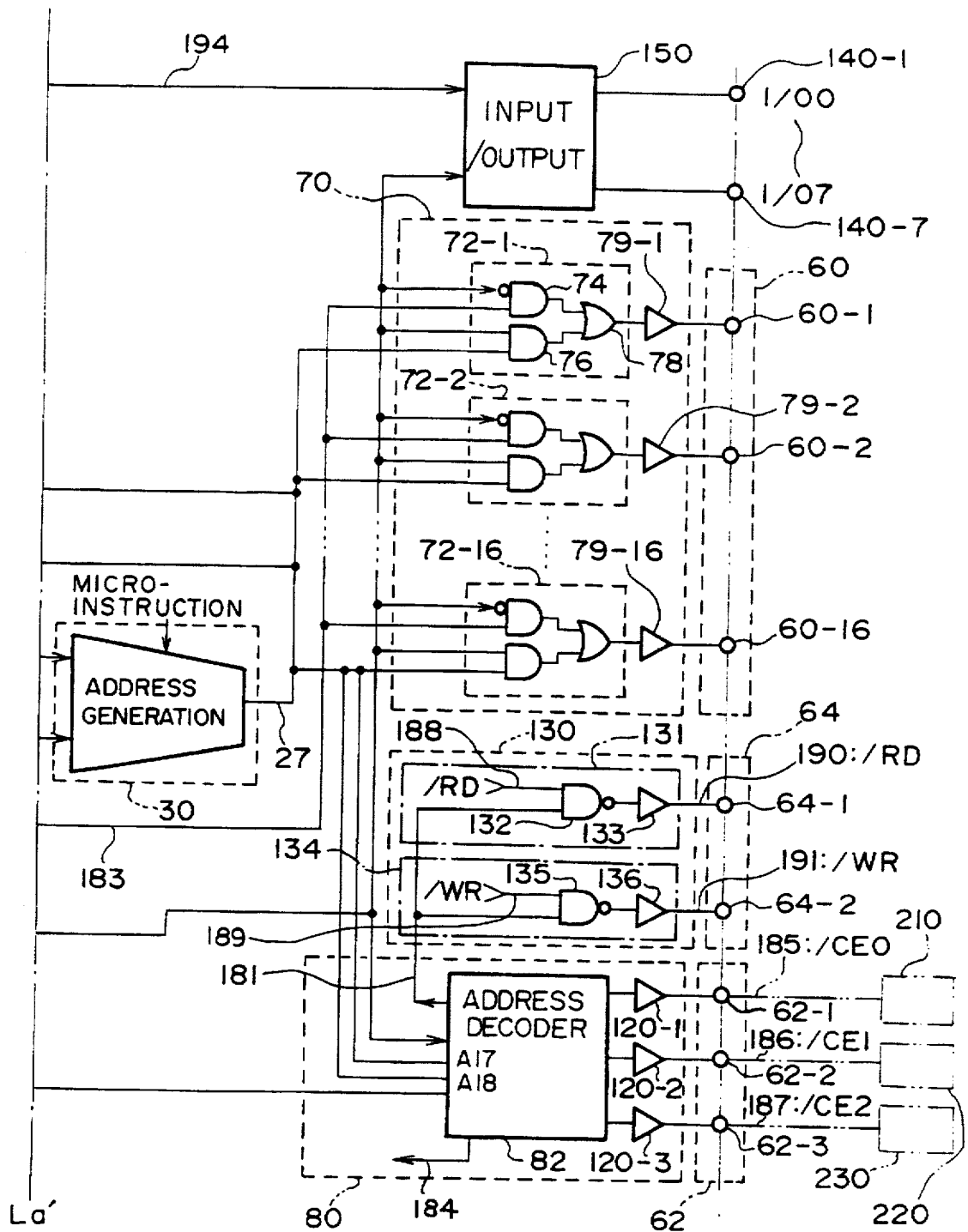

Before discussing the setting means/standby state setting means, or the like, which is characteristic of the present invention, first the basic configuration of the single-chip microcomputer is described with respect to FIGS. 1A and 1B. FIGS. 1A and 1B are block diagrams showing the basic configuration of a single-chip microcomputer according to the present invention.

The single-chip microcomputer 1 of this embodiment is, as shown in FIGS. 1A and 1B, connected to a plurality of for example three externally connected devices 210, 220 and 230, and has a function whereby based on the execution of program instructions, a chip enable signal and address signals are sent to one of the externally connected devices. The single-chip microcomputer 1 of this embodiment comprises an internal memory means 10, a processing means 20, an address generation means 30, a standby state setting means 40, a mode setting means 50, first output terminals 60 functioning as memory address output terminals, a first control means 70, second output terminals 62 functioning as chip select output terminals, a second control means 80 functioning as a control means, third output terminals 64, a third control means 130, input/output terminals 140, and an input/output unit 150.

The internal memory means 10, as shown in FIGS. 1A and 1B, is configured to comprise a program instruction memory means 11, an instruction register 12, an instruction decoder 13 generating microinstructions, a data memory means 14, a program counter 15, an index register 16, an output register 17, an input/output register 18, and temporary registers 19a and 19b.

The program instruction memory means 11 is embodied by for example a ROM, and stores program instructions. The instruction register 12 has the function of temporarily storing a program instruction which is the output of the program instruction memory means 11. The instruction decoder 13 which functions as a microinstruction generating means, has the function, based on the program instructions temporarily stored in the instruction register 12, of outputting microinstructions in sequence, and may for example constitute a PLA (programmable logic array) or micro-ROM.

The data memory means 14 is embodied by for example a RAM, and based on address signals 27 input via an address bus 26, has the function of loading the data from a specified address within the data memory means 14 via a data bus 24 for example into the temporary register 19a. The program counter 15 has the function of specifying the address of data within the program instruction memory means 11. The index register 16 has the function of, for example, though not particularly restricted thereto, specifying the address of data within the data memory means 14.

The output register 17 is connected by control lines to the internal data bus, and has various data written therein. It has the function of outputting the data signals 183 (for example, the yet-to-be-described scan signals of a second externally connected device 240 (FIG. 5) or display data signals of a third externally connected device 230) written therein through gate means 72 to the first output terminals 60. The output register 17 may also be configured to store certain calculation results from an arithmetic logic calculation unit 21, and in response to a program instruction to rewrite that stored data as required. It should be noted that in this embodiment the output register 17 and data memory means 14 are separate items, but the output register 17 may also be provided as one part of the data memory means 14.

The input/output register 18 stores second data, for example, memory data signals, for example, various input/ output data, for example, calculation output. Written-therein second data signals 194 are sent through the input/output unit 150 to input/output terminals (I/O0 to I/O7) 140-1 to 140-7. Temporary registers 19a and 19b, based on microinstructions 25, have the function of temporarily storing the output from the arithmetic logic calculation unit 21, and the function of outputting data to the arithmetic logic calculation unit 21, and in particular have the function of storing values pertaining to calculation and values to be calculated destined for the arithmetic logic calculation unit 21.

The processing means 20 comprises the arithmetic logic calculation unit 21 and an accumulator 22. The arithmetic logic calculation unit 21 has the function of carrying out arithmetic logic calculation based on microinstructions 25. The accumulator 22 serves for input and storage of the constantly changing calculation results of the calculation processing.

It should be noted that in this embodiment the internal memory means and processing means are configured as described above, but this is only an example to which the present invention is not restricted, being rather also capable of various other combinations.

The address generation circuit 30 which functions as an address generation means has the function of outputting address signals 27 specifying an address for second data signals 194 to the externally connected devices 210, 220, and 230, the function of specifying an address to the program instruction memory means 11, and the function of specifying an address to the data memory means 14. Additionally, the switching among these functions is carried out based on microinstructions 25.

1-2. Operation Sequence of the Single-Chip Microcomputer

The basic operation sequence of the single-chip microcomputer 1 is now described with reference to FIGS. 1A and 1B.

Firstly, a program instruction stored in the program instruction memory means 11 is fetched and written to the instruction register 12. The program instruction written to the instruction register 12 is decoded by the instruction decoder 13, and is output as various microinstructions 25 which are control signals. Based on the microinstructions 25, the various components of the single-chip microcomputer 1 are controlled.

When a microinstruction 25 is for example a calculation instruction which refers to an address, the address generated by the address generation means 30 is input via the address bus 26 to the data memory means 14, and specifies the address of data within the data memory means 14. This address data is temporarily loaded through the data bus 24 into the temporary register 19a. At this time, in the same way, the data of the accumulator 22 is temporarily loaded through the data bus 24 into the temporary register 19b. The selection of which data of the program counter 15 and index register 16 is output to the address bus 26 is made by the address generation means 30 according to the microinstruction 25 and the timing.

The data loaded into each of the two temporary registers 19a and 19b is processed by the arithmetic logic calculation unit 21, and calculation results are stored in the accumulator 22. The value of the accumulator 22 is transferred through the internal data bus 24 to the output register 17, output registers for input/output ports, and so forth.

2-1. The Setting Means/Standby State Setting Means

Figure 2:
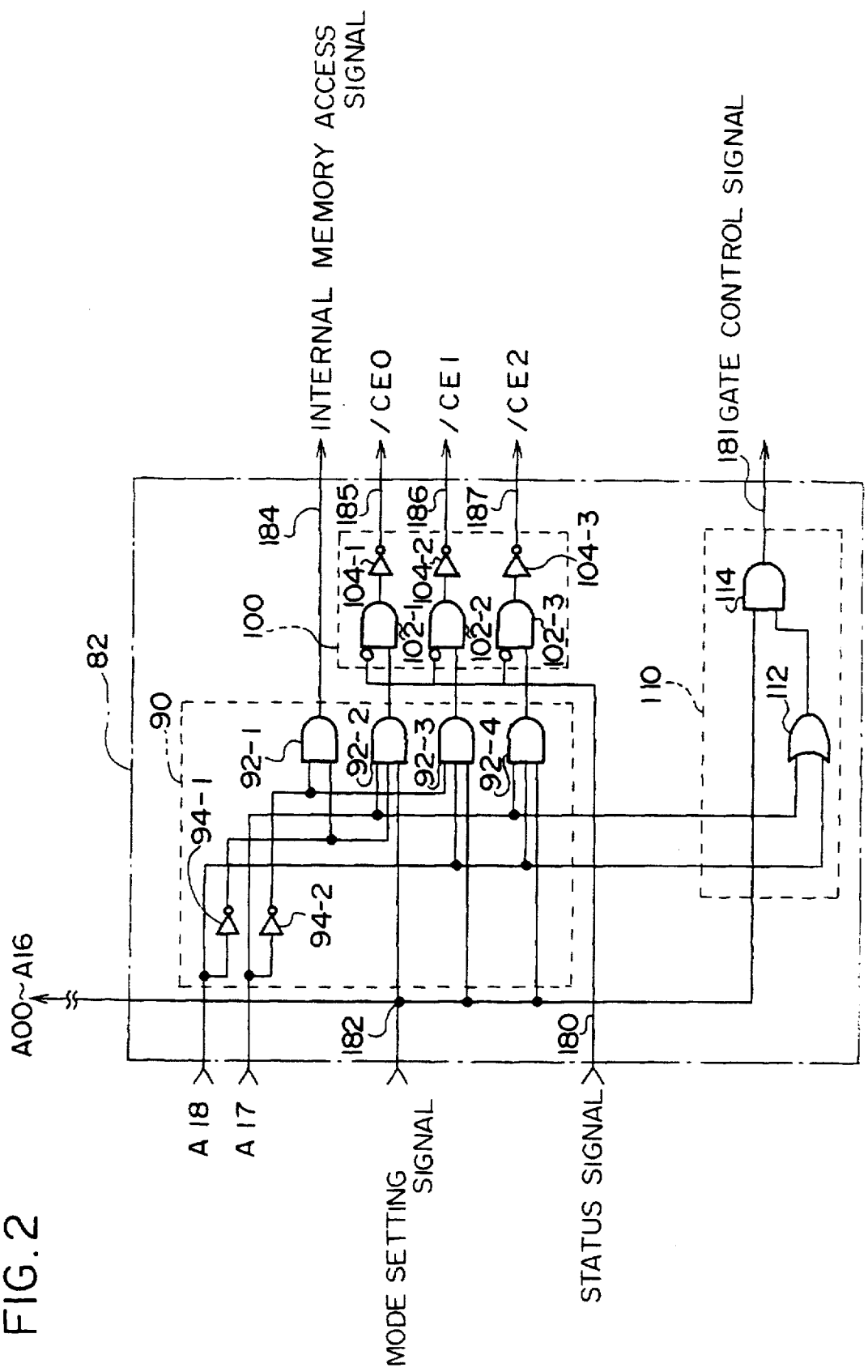
FIG. 2 is a circuit diagram of an address decoder in the single-chip microcomputer of FIGS. 1A and 1B.
Figure 3:
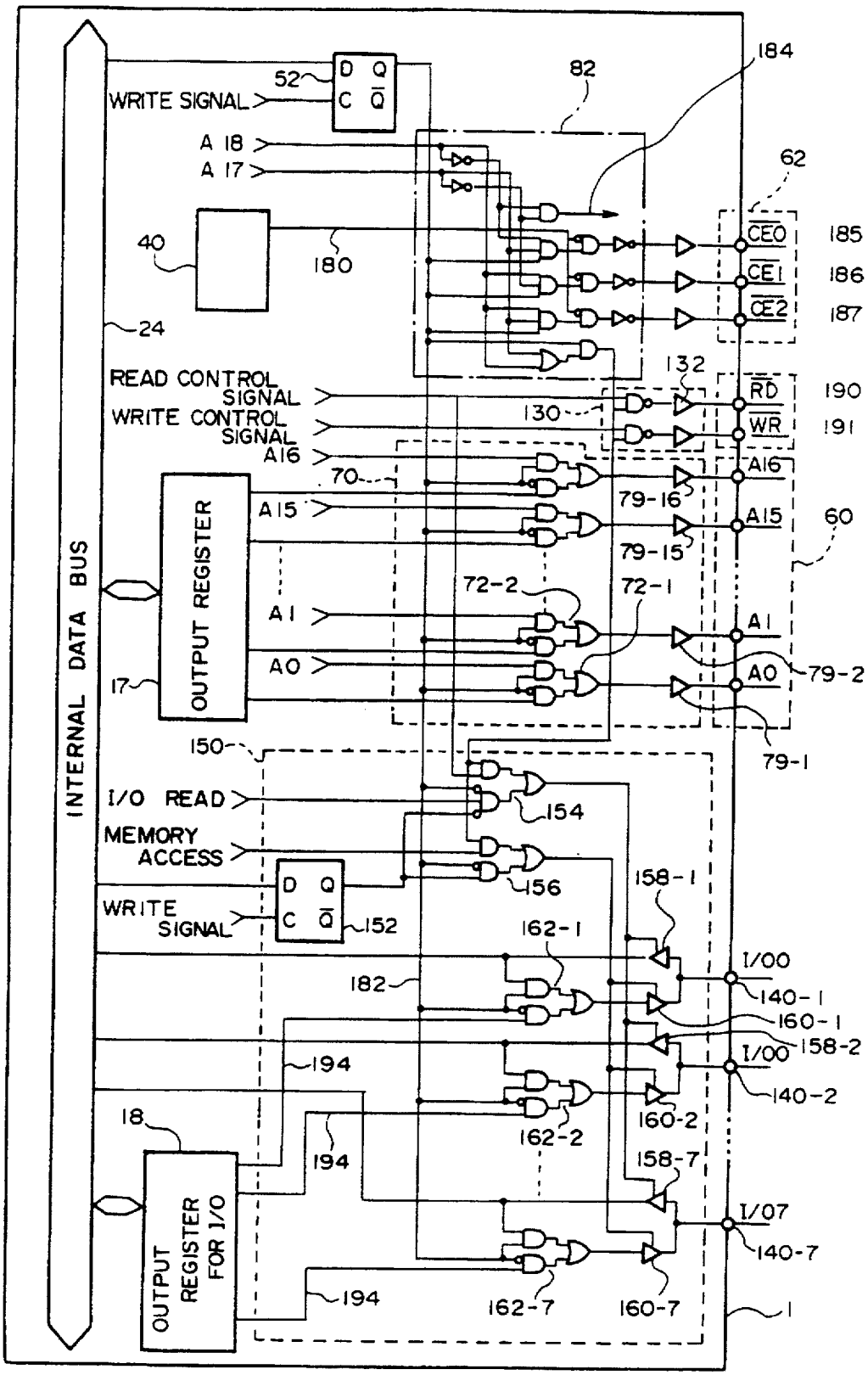
FIG. 3 is a block diagram showing a part of the configuration of a single-chip microcomputer according to the present invention.

Next the setting means/standby state setting means which is a characteristic of the present invention is described with reference to FIGS. 1 to 3. FIG. 2 is a circuit diagram of the address decoder. FIG. 3 is a block diagram showing a part of the configuration of the single-chip microcomputer.

The standby state setting means 40 has the function of setting the single-chip microcomputer 1 in the standby state. Here by standby state is meant a state in which the single-chip microcomputer 1 is not powered off, but the clock pulse is stopped, and execution of program instructions is halted temporarily.

The standby state setting means 40 has the function of outputting a status signal 180 which functions as a standby state setting signal for setting the standby state, and comprises a system clock generator 42 which functions as a signal generating means, a standby state setting unit 44, and a standby state release unit 46.

The system clock generator 42 has the function of generating the status signal 180 based on microinstructions 25. The standby state setting unit 44 has the function of stopping the generation of the clock pulse by the system clock generator 42 at the timing of the standby state setting, based on a microinstruction, for example UHALT.

During the interval in which the standby state is set, the standby state release unit 46, by means of the carrying out of interrupt control by an INT instruction or the like, has the function of ending the stopped state of the system clock generator, and restoring normal operation.

By means of the above control, the status signal 180 is output as a standby state setting signal, setting the standby state at a certain timing, and the normal operating state at another timing. In this embodiment, this is an active-high signal, being '1' for the standby state, and '0' for the normal operating state.

It should be noted that the basic timing signal of the single-chip microcomputer 1 is output by the system clock generator 42. The output of the basic timing signal by the system clock generator 42 is stopped by a microinstruction 25, to put the single-chip microcomputer 1 into the standby state. The program instruction used to put the single-chip microcomputer 1 into the standby state is generally a HALT instruction.

A mode setting register 52 included in the mode setting means 50 is connected by a control line to the internal data bus 24 of the single-chip microcomputer 1, being constituted by for example a D-type flip-flop circuit (FIG. 3), and has the function of outputting a mode setting signal 182 to the first control means 70, the second control means 80, the third control means 130, the input/output unit 150, and possibly other units. Here the mode setting signal 182 is a signal which, based on a program instruction, selects either of a first mode '1' in which address signals 27 are output from the first output terminals 60, and a second mode '0' in which data signals 183 are output.

In other words, when the mode setting signal 182 has the value 1, the address bus 26 is selected by the gate means 72-1 to 72-16, and the address signals 27 are output through the output drivers 79-1 to 79-16 to the output terminals 60-1 to 60-16.

On the other hand, when the mode setting signal 182 has the value 0, the data signals 183 supplied through the data bus are selected by the gate means 72-1 to 72-16, and the data signals 183 of the output register 17 are output through the output drivers 79-1 to 79-16 to the output terminals 60-1 to 60-16. It should be noted that these first and second modes can be established alternately and cyclically, or equally may not. The data signals 183 described here include key scan signals, display data signals, memory data signals such as calculation results signals, and so forth.

The first output terminals 60 (60-1 to 60-16) output selectively either of the address signals 27 or data signals 183, and are a plurality, for example 17 in number. The second output terminals 62 (62-1 to 62-3), based on the address signals 27, output selectively either of an active chip select signal being one of the chip select signals 185, 186, and 187 which select from the externally connected devices 210, 220, and 230, and are a plurality, for example three in number. The third output terminals 64 (64-1 and 64-2) output read/write signals to the externally connected devices 210, 220, and 230, and are a plurality, for example two in number, being one each for read and write.

The first control means 70, based on the mode setting signal 182 from the mode setting means 50, has the function of controlling the first output terminals 60 (60-1 to 60-16), and comprises a plurality of, for example 17, gate means 72 (72-1 to 72-16), and a plurality of, for example 17, output drivers 79 (79-1 to 79-16).

The gate means 72 (72-1 to 72-16) have the function in the first mode of inhibiting the output of the data signals 183. In the second mode they allow the output of the data signals 183 through the output drivers 79. To the gate means 72 are input in addition to the data signals 183 of the output register 17, address signals 27, and based on the setting of the mode setting signal 182 according to the microinstructions 25, one of these two is selected, and output to the outside through the output drivers 79.

The second control means 80 functioning as a control means, based on the status signal 180 functioning as a standby state setting signal from the standby state setting means 40, has the function of controlling and making inactive the chip select signals 185 (/CE0), 186 (/CE1) and 187 (/CE2) output from the second output terminals 62 (62-1 to 62-3), and comprises an address decoder 82, and drivers 120 (120-1 to 120-3).

To the address decoder 82 are input the two highest order bits (A17 and A18) of the 19 bits of the address signals 27 being A0 to A19 supplied through the address bus 26, the mode setting signal 182, and the status signal 180 output from the system clock generator 42. Based on these signals, the address decoder 82 has the function of, as described below, in the second mode '0' outputting an internal memory access signal 184 and a gate control signal 181, and in the first mode '1' outputting one of the chip select signals 185 (/CE0), 186 (/CE1) and 187 (/CE2), and comprises a first gate means 90, a second gate means 100, and a gate control signal generating means 110. In the first mode, from one of the second output terminals 62 (62-1 to 62-3), one of the chip select signals 185 (/CE0), 186 (/CE1) and 187 (/CE2) is output in the active state. These chip select signals are output through the drivers 120-1, 120-2 and 120-3 to the output terminals 62-1, 62-2 and 62-3.

The first gate means 90 has the function, based on the logical value of a number, for example two, of the highest order bits of the address signals 27 corresponding to a number, for example four, of address regions, of selecting the externally connected devices 210, 220 and 230, and so forth.

The second gate means 100 has the function, based on the output of the first gate means 90 corresponding to the selected of the externally connected devices 210, 220 and 230, and the status signal 180, of making inactive any of the chip select signals 185, 186 and 187 which might be active.

The third control means 130 has the function, when the mode setting signal 182 is in the second mode, based on the gate control signal 181 output by the second control means 80, of inhibiting the output of either the read control signal (/RD) 188 or write control signal (/WR) 189, and comprises a first gate means 131 and a second gate means 134.

The first gate means 131 has the function, based on the gate control signal 181, of outputting the read control signal (/RD) 188 to the output terminal 64-1 functioning as a fourth output terminal for read control signals, and comprises a NAND gate 132 and driver 133. Based on control by the gate control signal 181 output from the address decoder 82, the read control signal (/RD) 188 is output through NAND gate 132 and driver 133 to output terminal 64-1.

The second gate means 134 has the function, based on the gate control signal 181, of outputting the write control signal (/WR) 189 to the output terminal 64-2 functioning as a fifth output terminal for write control signals, and comprises a NAND gate 135 and a driver 136. Based on control by the gate control signal 181 output from the address decoder 82, the write control signal (/WR) 189 is output through NAND gate 135 and driver 136 to output terminal 64-2.

The gate control signal generating means 110 has the function of generating the gate control signal 181 based on the logic of the two highest order bits, A17 and A18, of the address signals 27 and the mode setting signal 182, and comprises an OR gate 112 and AND gate 114.

Next the internal configuration of the input/output unit 150 is described with reference to FIG. 3. FIG. 3 illustrates in detail the particulars of the input/output unit 150.

The input/output unit 150 includes an input/output switching register 152, selector circuits 154 and 156, an input buffer 158, an output buffer 160, and a selector circuit 162.

The input/output switching register 152 is connected through a control line to the internal data bus 24, and comprises for example a D-type flip-flop circuit. When the switching signal of this input/output switching register 152 has for example the value 1, the output mode is selected, and when it has the value 0, the input mode is selected. The switching signal of the input/output switching register 152 is input together with the mode setting signal 182 and I/O read signal to the selector circuit 154, and is input together with the mode setting signal 182 and memory access signal to the selector circuit 156.

The selector circuit 154 controls by its output the input buffer 158, and the selector circuit 156 controls by its output the output buffer 160. The input buffer 158 and output buffer 160 are connected to the same input/output terminals 140, and constitute a bidirectional buffer for the same (the same is true of other input buffers and output buffers).

In the selector circuit 162, second data signals for the output register 18 for the input/output port such as memory data signals or data pertaining to the internal data bus 24 are switched appropriately according to the mode setting signal 182, and output to the output buffer 160.

It should be noted that in this example for the sake of simplicity an extremely simple configuration is described, but the configuration may equally include plural kinds of data buses, a large number of registers including registers for input ports, a large number of terminal such as input terminals and the like, a stack pointer, and so on.

2-2. Operation of the second control means, being a setting means

Next the operation of the second control means 80 is described based on FIG. 2.

Firstly, when the mode setting signal 182 has the value 1, the operation is that of an external memory access mode. In this embodiment, the CPU has a 512K byte addressing region (19-bit addressing), and this is divided into four address groups each of 128K bytes. In other words, A18 and A17 of the address signals 27 are input to the address decoder 82 and, as shown in Table 1, a space of the address bus which is 19 bits/512K byte is divided into four addressing regions of 128K bytes. This is shown in Table 1.

TABLE 1

| | CE2 | CE1 | CE0 | A18 | A17 | A16 | A15 | A14 | A13 | A12 | A11 | A10 | A9 | A8 | A7 | A6 | A5 | A4 | A3 | A2 | A1 | A0 | Matching memory |
|---|---|---|---|---|---|---|---|---|---|---|---|---|---|---|---|---|---|---|---|---|---|---|---|
| 128 (K) | 1 | 1 | 1 | 0 0 0 1 | 0 0 0 1 | 0 1 | 0 1 | 0 0 F | 0 1 | 0 1 | 0 1 | 0 0 F | 0 1 | 0 1 | 0 1 | 0 0 F | 0 1 | 0 1 | 0 1 | 0 0 F | 0 1 | 0 1 | Internal memory |
| 128 (K) | 1 | 1 | 0 | 2 3 | | | | 0 F | | | | 0 F | | | | 0 F | | | | 0 F | | | Externally connected device 0 |
| 128 (K) | 1 | 0 | 1 | 4 5 | | | | 0 F | | | | 0 F | | | | 0 F | | | | 0 F | | | Externally connected device 1 |
| 128 (K) | 0 | 1 | 1 | 6 7 | | | | 0 F | | | | 0 F | | | | 0 F | | | | 0 F | | | Externally connected device 2 |

Here this division is into addresses 00000H to 1FFFFH forming an address region for the internal memory of the single-chip microcomputer 1, addresses 20000H to 3FFFFH forming an address region for the externally connected devices 210, addresses 40000H to 5FFFFH forming an address region for the externally connected devices 220, and addresses 60000H to 7FFFFH forming an address region for the externally connected devices 230.

When the address bus 26 is indicating one of the address regions of the externally connected devices 210, 220 and 230, the mode setting signal 182 has the value 1, and one of the chip select signals (/CE0), (/CE1) and (/CE2) being the respective memory enable signals for these external memory devices is active, enabling external memory access.

In this way, with the division into four address groups, by means of the address decoder 82, any one of the internal memory access signal 184 and the chip select signals /CE0 to /CE2 is made active.

Here, while the single-chip microcomputer 1 is operating the status signal 180 has the value 0, and when the single-chip microcomputer 1 is on standby the value is 1. When the mode setting signal 182 has the value 1, the status signal 180 is set to 1. As a result, the externally connected devices is stopped and the internal current flow is stopped, then the overall power consumption of the system can be reduced.

When, however, one of the chip select signals is active, the read control signal 188 and write control signal 189 output from the CPU are output through respective NAND gates and output buffers as the corresponding /RD and /WR signals to output terminals 190 and 191, and the data of the externally connected devices, for example a RAM, is read or written.

3. Overall Operation

Next the overall operation of the single-chip microcomputer 1 constituted as described above is described with reference to FIGS. 1 to 4. FIGS. 4A and 4B are timing charts illustrating the above operation. The example shown in FIGS. 4A and 4B are of the case that one machine cycle consists of four clock pulses.

In cycle T1 in FIG. 4, the address signals 27 address the internal memory, and the mode setting signal 182 is set to mode 0. The internal memory access signal 184 and read control signal are output from the address decoder 82, and the data from the internal memory corresponding to the address signals is read.

If the mode setting register 52 is set to 0, the address decoder 82 causes the chip select signals 185, 186, and 187, the read control signal 188, and the write control signal all to go high, thus being inactive, whereby access to the externally connected device 210 is inhibited.

The data signals 183 of the output register 17 are selected by the gate means 72, and these data signals 183 appear on the first output terminals 60 for address signals. These data signals 183, are for example supplied as scan signals for a key matrix being a member of a second externally connected devices described below. At this time, the input/output switching register 152 is set to 0, and the key input from the key matrix is captured by the CPU through the input buffer 158 and internal data bus 14.

On the other hand, the mode setting register 52 is constituted by a peripheral circuit configured as memory-mapped I/O. Therefore, the write signal consists of a signal obtained by forming the logical AND of the register selection signal and the internal write control signal in CPU.

That is to say, if the address of the mode setting register 52 is specified as address xxxx, when address xxxx is accessed it is decoded, a register selection signal is generated, and the mode setting register 52 is selected, and moreover, with the timing of generation of the write control signal, by means of the execution of a program instruction the required value is written to the mode setting register 52.

In the embodiment of FIGS. 1A and 1B, when the mode setting register 52 has the value 0, with respect to the output of A0 to A16, the data signals 183 of the output register 17 are output, and by execution of a program instruction, the mode setting is set to 1, whereupon A0 to A16 become the address output. It should be noted that since the mode setting register 52 is configured as memory-mapped I/O, it can easily be rewritten by means of a memory manipulation instruction.

In cycle T2, the mode setting signal 182 is set to mode 1. Additionally, the read control signal 188 is output through the first gate means 131 as the /RD 190 from the output terminal 64-1, together therewith the chip select signal 185 is output from the output terminal 62-1, and data signals from the required externally connected device 210, for example a RAM, are read out according to the address signals 27, and are transferred to the CPU through the input/output terminals 140.

More specifically, by means of the first gate means 131, when the mode setting signal 182 has the value 1, the (/RD) 188 is output through the output driver 133 to the output terminal 64-1.

When the data signals from the externally connected devices, for example a RAM, are read in, the input/output switching register 152 is set to 0, by means of the selector circuit 154 the input buffer 158 is made active, and second data signals from the externally connected devices, for example a RAM, are taken in through the data bus 24 according to the address signals.

The status signal 180 output by the standby state setting means 40 takes the value 1, and the CPU is put on standby. By this means, by input to the second control means 80 of the status signal 180 with the value 1, the chip select signal 185 which was active is made inactive, and is output from the output terminal 62-1; the externally connected device 210 is rendered inactivated. By this means, no current is consumed by the externally connected device 210, and a lowering of the power consumption of the whole system can be achieved.

By means of an INT instruction or the like of the standby state release unit 46, the standby state is ended and normal operation is restored.

In cycle T4, the mode setting signal 182 is set to mode 1. Additionally, the /RD 190 and chip select signal 186 are output, and data signals from the required externally connected device 220, for example a RAM, are read out according to the address signals 27, and are transferred to the CPU through the input/output terminals 140.

The status signal 180 output by the standby state setting means 40 takes the value 1, and the CPU is put on standby. By this means, by input to the second control means 80 of the status signal 180 with the value 1, the chip select signal 186 which was active is made inactive, and is output from the output terminal 62-2; the externally connected device 220 is rendered inactivated. By this means, no current is consumed by the externally connected device 220, and a lowering of the power consumption of the whole system can be achieved.

In cycle T6, the mode setting signal 182 is set to mode 1. Additionally, the /RD 190 and chip select signal 187 are output, and data signals from the required externally connected device 230, for example a RAM, are read out according to the address signals 27, and are transferred to the CPU through the input/output terminals 140.

The status signal 180 output by the standby state setting means 40 takes the value 1, and the CPU is put on standby. By this means, by input to the second control means 80 of the status signal 180 with the value 1, the chip select signal 187 which was active is made inactive, and is output from the output terminal 62-3; the externally connected device 230 is rendered inactivated. By this means, no current is consumed by the externally connected device 230, and a lowering of the power consumption of the whole system can be achieved.

In cycle T8, the mode setting signal 182 is set to mode 0. Additionally, the write control signal 189 and internal memory access signal 184 are output, and data is written from the CPU to internal memory according to the address signals 27.

In cycle T9, the mode setting signal 182 is set to mode 1. Additionally, the write control signal 189 is output through the second gate means 134 as the /WR 191 from the output terminal 64-2, together therewith the chip select signal 185 is output from the output terminal 62-1, and second data signals 194 from the output register 18 for the input/output port are output through the input/output terminals 140, and are written to an address specified by the address signals 27 of the corresponding externally connected device 210, for example a RAM.

In other words, by means of the second gate means 134, when the mode setting signal 182 has the value 1, the write control signal 189 is output through the output driver 136 to the output terminal 64-2.

When data signals are written to the externally connected devices, for example a RAM, the input/output switching register 152 is set to 1 and by means of the selector circuit 156 the output buffer 160 is made active, and the second data signals 194 of the output register 18 for the input/output port are transferred through the selector circuit 162 to the output buffer 160, and written to the particular address of the externally connected device, for example a RAM, according to the address signals.

The status signal 180 output by the standby state setting means 40 takes the value 1, and the CPU is put on standby. By this means, by input to the second control means 80 of the status signal 180 with the value 1, the chip select signal 185 which was active is made inactive, and is output from the output terminal 62-1; the externally connected device 210 is rendered inactivated. By this means, no current is consumed by the externally connected device 210, and a lowering of the power consumption of the whole system can be achieved.

In cycle T11, the mode setting signal 182 is set to mode 1. Additionally, the /WR 191 and chip select signal 186 are output, and second data signals 194 from the output register 18 for the input/output port are output through the input/output terminals 140, and are written to an address specified by the address signals 27 of the corresponding externally connected device 220, for example a RAM.

The status signal 180 output by the standby state setting means 40 takes the value 1, and the CPU is put on standby. By this means, by input to the second control means 80 of the status signal 180 with the value 1, the chip select signal 186 which was active is made inactive, and is output from the output terminal 62-2; the externally connected device 220 is rendered inactivated. By this means, no current is consumed by the externally connected device 220, and a lowering of the power consumption of the whole system can be achieved.

In cycle T13, the mode setting signal 182 is set to mode 1. Additionally, the /WR 191 and chip select signal 187 are output, and second data signals 194 from the output register 18 for the input/output port are output through the input/output terminals 140, and are written to an address specified by the address signals 27 of the corresponding externally connected device 230, for example a RAM.

The status signal 180 output by the standby state setting means 40 takes the value 1, and the CPU is put on standby. By this means, by input to the second control means 80 of the status signal 180 with the value 1, the chip select signal 187 which was active is made inactive, and is output from the output terminal 62-3; the externally connected device 230 is rendered inactivated. By this means, no current is consumed by the externally connected device 230, and a lowering of the power consumption of the whole system can be achieved.

By virtue of the above described first embodiment, the following efficacies are obtained.

(1) By means of the second control means, when the single-chip microcomputer is on standby, chip select signals are always inactive. For this reason, with the externally connected devices disabled, no internal current flows, and the overall power consumption of the system can be reduced, and application to a portable device or the like requiring battery operation becomes possible.

(2) Whether the single-chip microcomputer is executing an instruction stored in internal memory, or whether executing an instruction stored in an externally connected device, when on standby the externally connected device can be disabled. As a result, the overall current consumption of the system can be reduced. When, therefore, applied to a portable device or the like requiring battery operation, the battery operating lifetime can be lengthened, or the electronic device made more compact by reducing the number of batteries.

Moreover, since program instructions can be stored in an externally connected device and control carried out on the basis of these program instructions, without the need to provide branches of CPU control to program instructions in the internal memory, the software overhead is reduced, and software debugging is made simpler.

(3) By means of the mode setting means, a mode setting signal is set to either one of a first mode or a second mode, whereby address or data signals can be output selectively from the first output terminals for address signals.

Specifically, when the mode setting signal is set to the first mode, access to the externally connected devices is possible, but when set to the second mode access to the externally connected devices is inhibited. In the second mode, data signals are supplied to the second externally connected devices, and misoperations such as the incorrect supply of the data signals to the external connection terminals are prevented. In this way, by using the first output terminals for both address signals and data signals, the number of terminals is reduced, and the device can be made more compact.

(4) In the second mode, the third control means can prevent output of the write signal and read signal. Therefore, when outputting data signals to the second external memory devices, read and write operations do not occur. Additionally, only when address signals are output from the first output terminals, reading and writing are performed, and events such as the reading of incorrect data from the externally connected devices or writing of incorrect data to the externally connected devices do not occur.

Further, in the first mode, by means of the output of a read signal or write signal from the third output terminals, reading or writing with respect to a member of the first set of externally connected devices can be carried out through the input/output terminals.

(5) By means of the first gate means, by controlling the gate control signal which influences the mode setting signal, the output of the read signal can be adjusted. Specifically, in the first mode, the read signal is output, and reading from the externally connected devices is carried out, while in the second mode output of the read signal is inhibited, and reading is stopped.

Similarly, by means of the second gate means, by controlling the gate control signal which influences the mode setting signal, the output of the write signal can be adjusted.

Specifically, in the first mode, the write signal is output, and writing to the externally connected devices is carried out, while in the second mode output of the write signal is inhibited, and writing is stopped.

(6) By means of the gate means, the output of address signals can be prevented, and misoperations such as incorrect access to the externally connected devices can be prevented. Furthermore, in the second mode, data signals output from the first output terminals can be input to the input/output terminals through a member of the second set of externally connected devices.

(7) By means of the first gate means, any of the externally connected devices can be selected. Then, when selected, based on the status signal, a chip select signal active in the second gate means can be forcibly set to inactive.

(8) By means of microinstructions generated by means of microinstruction generating means, when a standby state setting signal is made active, and the single-chip microcomputer is put into the standby state, a chip select signal can be made inactive.

(9) By making common terminals for address signals and terminals for data signals, the number of output terminals of a single-chip microcomputer for application to an electronic notebook, electronic dictionary, or the like, can be reduced, the cost and size of the IC and mounted components can be reduced, the finished product can be made more compact, and enhanced thinness can be achieved, all these being particularly effective for an electronic notebook, electronic dictionary, or the like.

Second Embodiment

Figure 5:
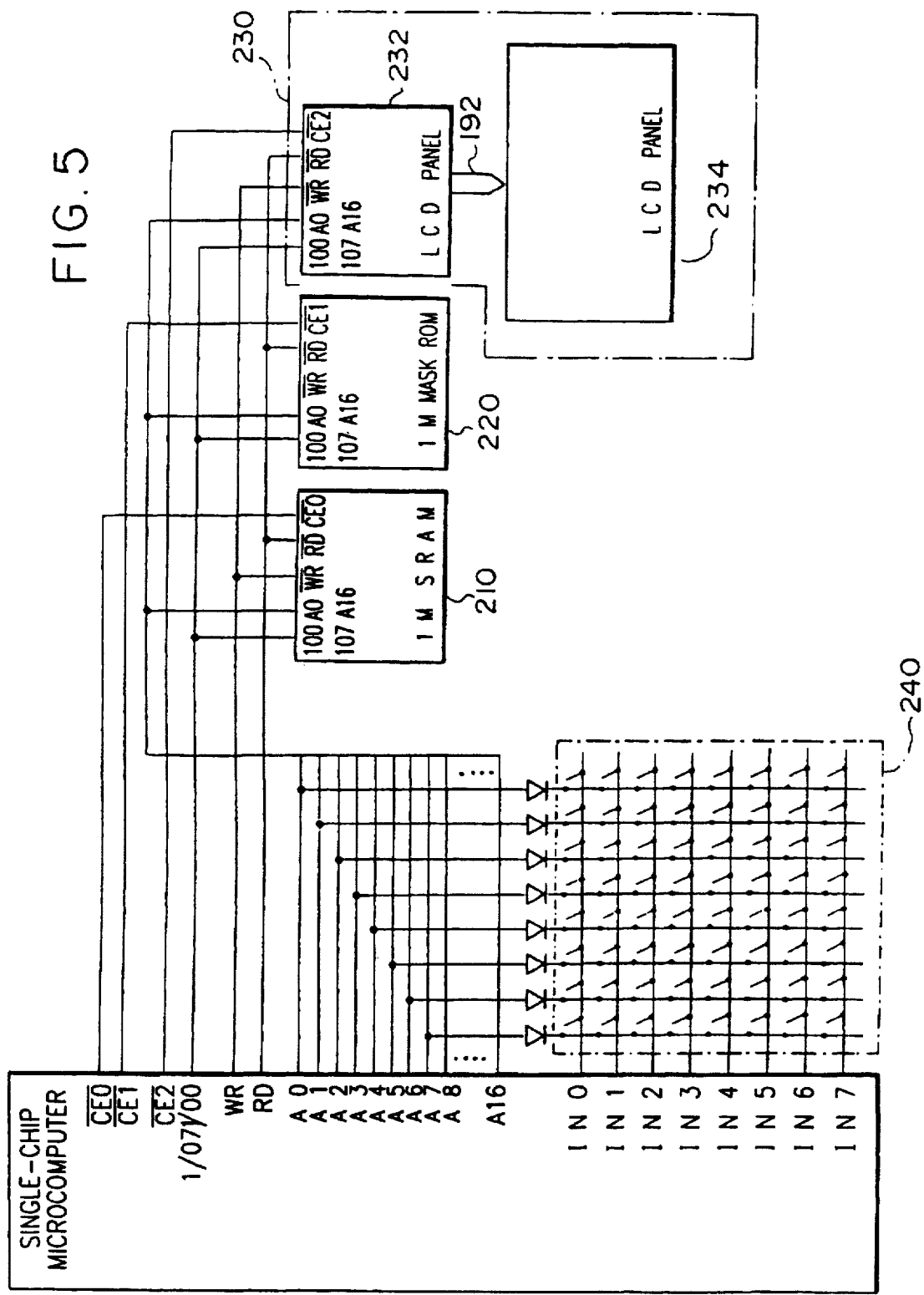
FIG. 5 is a diagram showing an example of an electronic device incorporating the single-chip microcomputer according to the present invention.
Figure 6:
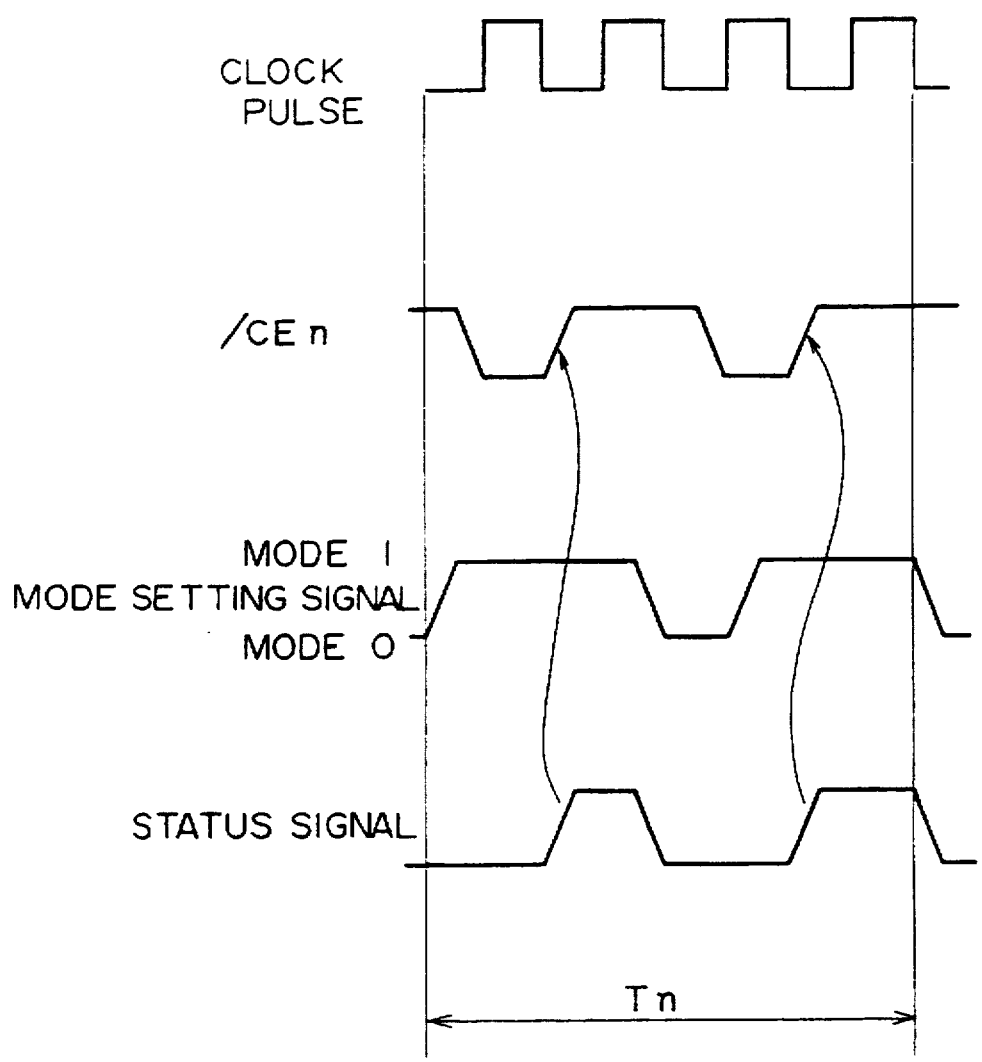
FIG. 6 is a timing chart illustrating the operation of a portion of the single-chip microcomputer shown in FIG. 5.

Next, a second embodiment of the present invention is described with reference to FIGS. 5 and 6. Description of structural elements substantially the same as in the first embodiment is omitted, and only the points of difference are noted. In this second embodiment, the single-chip microcomputer 1 of the first embodiment has first externally connected devices, second externally connected devices, and third externally connected devices connected thereto. FIG. 5 is a block diagram showing the configuration of an electronic device using the single-chip microcomputer.

In this embodiment, the single-chip microcomputer 1 of FIGS. 1A and 1B have connected thereto, as the first externally connected devices a static RAM (henceforth referred to as an SRAM) 210, a mask ROM 220, and possibly other items, as the third externally connected devices a display means 230, and as the second externally connected devices a keyboard 240.

As program instructions are executed, this single-chip microcomputer 200 has the function of supplying memory address signals to either of the SRAM 210 and mask ROM 220, carrying out read/write control of the second data signals, supplying data signals, for example display data signals, to the display means 230, carrying out data display control. The single-chip microcomputer 200 supplies data signals, for example key scan signals, to the keyboard 240, and carries out key input processing control.

The single-chip microcomputer 200 and the externally connected devices (210, 220 and 230) are connected by data input terminals I/O1 to I/O7, a write control signal /WE (/WRITE), a read control signal (/READ), chip select signals (/CE0, /CE1 and /CE2), memory address signals A0 to A16, and possibly others.

The SRAM 210 is configured with 1M bits (128K bytes). The mask ROM 220 is configured with 1M bits (128K bytes). The mask ROM 220 also stores program instructions, and when a HALT instruction is executed by a program instruction stored in the mask ROM 220, the single-chip microcomputer 200 enters the standby state. At this point, the external memory enable signals, that is, the /CE0 signal, the /CE1 signal, and the /CE2 signal, all become inactive.

The display means 230 comprises an LCD driver 232 and an LCD panel 234. With the configuration of an electronic device shown in FIG. 5, application to an electronic notebook, electronic dictionary, or the like is possible, and through the LCD driver 232 the single-chip microcomputer 200 can display particular display data 192 on the LCD panel 234. It should be noted that 192 is a display signal output from the LCD driver 232 for driving the LCD panel 234.

The keyboard 240 being a key matrix is configured as a key matrix formed by the output terminals A0 to A7 and the input terminals IN0 to IN7 of the single-chip microcomputer 200, and has the function of inputting to input terminals IN0 to IN7 the scan signal output from A0 to A7 of the first output terminals A0 to A16, and in the first mode of carrying out key input processing of the key matrix.

The first output terminals A0 to A7 connected to the keyboard 240 are also used for address signal output, and as described for the first embodiment above, by means of a mode setting signal 182, according to program instructions, provide address signal output or a key scan output signal for key input determination. It should be noted that the first output terminals A8 to A16 are used for both address signals and data signals, but are not connected to the key matrix. As a result, the first output terminals A8 to A16 do not output scan signals for key input, but in place thereof may equally be used for use in common with the input/output terminals I/O0 to I/O7 for the output of second data signals, for example calculation results calculated internally, or the like which are output by other input/output terminals I/O0 to I/O7. In this case, the internal output register 17 may have the functions both of a register storing calculation results and the like being the second data signals, and of a register storing scan signal data for key input operations.

When the output terminals A0 to A7 pertain to key scan output signals, since all of the chip select signals (/CE0, /CE1 and /CE2) are inactive, the reading out of incorrect data from the SRAM 210 or mask ROM 220, or the writing of incorrect data to the SRAM 210 does not occur.

Next, the operation is described.

When the single-chip microcomputer 200 accesses an externally connected device, the mode selection signal takes the value 1, and address signals are output from the address signal terminals A0 to A16.

At this time, the chip select signal /CE0 is output from the single-chip microcomputer 200 to the SRAM 210, and access to the SRAM 210 is enabled. A chip select signal which is active is made inactive. Moreover, as shown in FIG. 6, during a cycle Tn, modes 1 and 0 may be switched cyclically, and a status signal set to 1. In this way, by making inactive any particular chip select signal which is active, when for example the externally connected device is a RAM or the like, no current flows in an internal sense amplifier or the like, and the power consumption can be reduced.

Next, in the case that input data from the keyboard 240 is input to the single-chip microcomputer 200, the mode setting signal takes the value 0.

Data for the key scan is written from the arithmetic logic calculation unit 21 of FIGS. 1A and 1B to the output register 17, the data of the output register 17 is output to terminals for address signals A0 to A7, and scanning performed, and key data is read in consecutively through the input terminals IN0 to IN7. At this time, the write control signal (/WE), read control signal (/RE), and chip select signals (/CE0, /CE1 and /CE2) are inactive, and access to the SRAM 210 and mask ROM 220 and the like is inhibited.

However, in general applications, while the access time to the SRAM 210, mask ROM 220, and the like is short, the time of a manual key press is significantly long in terms of the processing speed of the single-chip microcomputer 200. Therefore, if the mode setting signal is cyclically switched between 1 and 0, and memory access and key processing carried out in parallel, there will in practice be absolutely no problem.

To take as an example an electronic telephone book, when the electronic telephone book is powered on, and the system is waiting for a key press, the mode setting register is set to 0, and the terminals A0 to A7 output data for a key scan. It is then possible for key input processing to be carried out by virtue of program instructions.

If it is supposed that key input is used for example to enter a person's name, the program then starts search processing to find the telephone number corresponding to the name. At this time, in order that the SRAM 210 or the like in which the telephone number is stored can be accessed, the mode selection register should be rewritten with the value 1.

When the mode setting is set to mode 1, access to the SRAM 210 and the like becomes possible, and in addition to searching for data, other processing such as saving information or sorting is possible.

Sampling once every 30 to 50 milliseconds is adequate for manual key input, and therefore even when processing data of the SRAM 210 or the like, if the mode setting is switched to 0 every 30 to 50 milliseconds and key input processing carried out, it will be possible to continue processing without any key inputs being lost.

Sampling and key processing in this way can be implemented easily by using a timer interrupt function built into a conventional microprocessor.

By virtue of the above described second embodiment, the following efficacies are obtained.

(1) The access time to the first externally connected devices is short, but for an operation, for example a manual key press, of for example the second externally connected devices the time is significantly long in terms of the processing speed of the single-chip microcomputer. Therefore, even while processing signals of the first externally connected devices, it is possible to switch to the second mode, and carry out input processing for the second externally connected devices. As a result, by switching the mode setting signal alternately and cyclically between the first mode and the second mode, with memory access to the first externally connected devices and processing with respect to the second externally connected devices carried out in parallel, there will in practice be absolutely no problem.

(2) By means of the output of a key scan signal, a key matrix can be scanned, and a key input captured through input/output terminals, whereby the key matrix can be put into the operating state. By carrying this out in the second mode, input of data to the internal system can be carried out.

(3) The access time to external memory is short, but the time of a manual key press is significantly long in terms of the processing speed of the single-chip microcomputer. As a result, by switching the mode setting signal cyclically between the first mode and the second mode, and carrying out memory access and key processing in parallel, there will in practice be absolutely no problem.

More specifically, in the second mode, data signals are output from the first output terminals. By means of these data signals, the key matrix is scanned, and a key input is captured through the input terminals, whereby the key matrix is put into the operating state.

After carrying out key input processing in the second mode by virtue of program instructions, the process of searching for memory data signals and the like stored in external memory is started, and the mode setting means is set to the first mode. Then, when the mode setting means is set to the first mode, access to the external memory becomes possible. At this time, it is not possible to accept input data from the key matrix, but normally if sampling for manual finger key input is carried out once every 30 to 50 milliseconds no input will fail to be accepted. Therefore, even when processing of second data signals of the external memory is carried out through the input/output terminals, if the mode setting means is switched to the second mode every 30 to 50 milliseconds, and key input processing carried out, it will be possible to continue processing without any key inputs being lost.

(4) By incorporation of the single-chip microcomputer described above, power consumption can be reduced. Furthermore, by making the first externally connected devices memory means, program instructions can be stored, and the software overhead can be reduced.

(5) By connecting a display means, calculation results, calculation processing, and the like from within the single-chip microcomputer can be displayed.

(6) By the provision within the display driver of a means for specifying a position on the display panel based on the address signals, it becomes possible to specify, based on the chip select signals, address signals and possibly other items, the specification of the display data signals and the like to be displayed on the display panel. By this means it becomes possible to display on the display panel the display data signals and the like as text, graphics, and possibly other items.

(7) If apart from the keyboard, another IC such as a dialer IC is connected, it is still possible to use for the control of the dialer IC or the like output terminals which were previously used only for the output of addresses. As a result, the more complicated the system configuration of the system, the greater the benefit of the application of the present invention.

Figure 7:
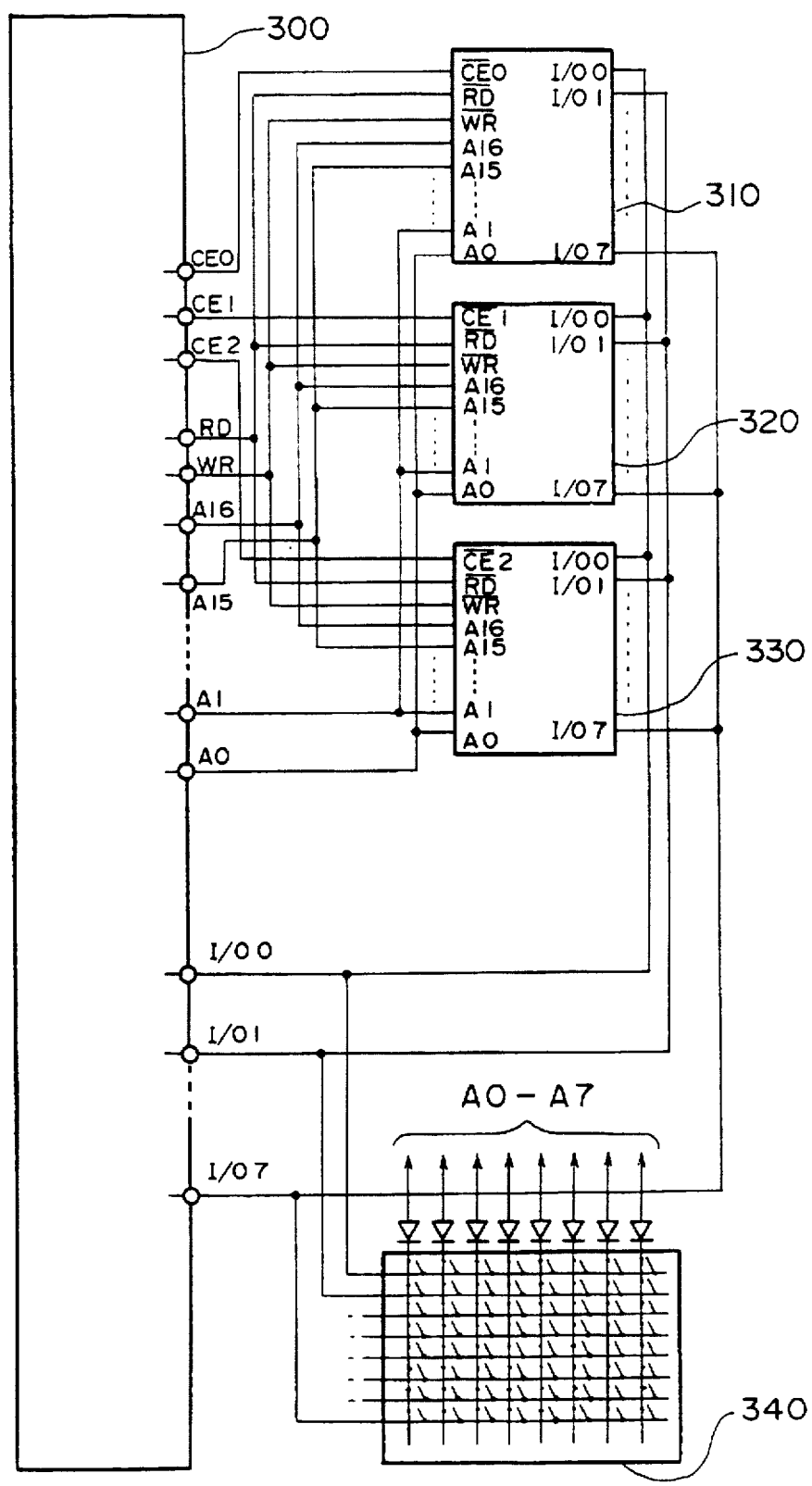
FIG. 7 is a diagram showing another example of an electronic device incorporating the single-chip microcomputer according to the present invention.

It should be noted that the device and method of the present invention have been described above in terms of a number of particular embodiments, but a number of variations of these embodiments will be clear to one skilled in the relevant art, without going outside the gist and scope of the present invention. For example, the above second embodiment describes a configuration with SRAM, ROM, display means and possibly other items connected as the externally connected devices, but the present invention is not restricted to this, and as shown in FIG. 7 the single-chip microcomputer 300 may have connected as externally connected devices entirely memory means 310, 320, and 330. In FIG. 7 the configuration may have the key matrix 340 provided not as in the second embodiment to the input terminals, but provided to the input/output terminals I/O0 to I/O7.

Figure 8:
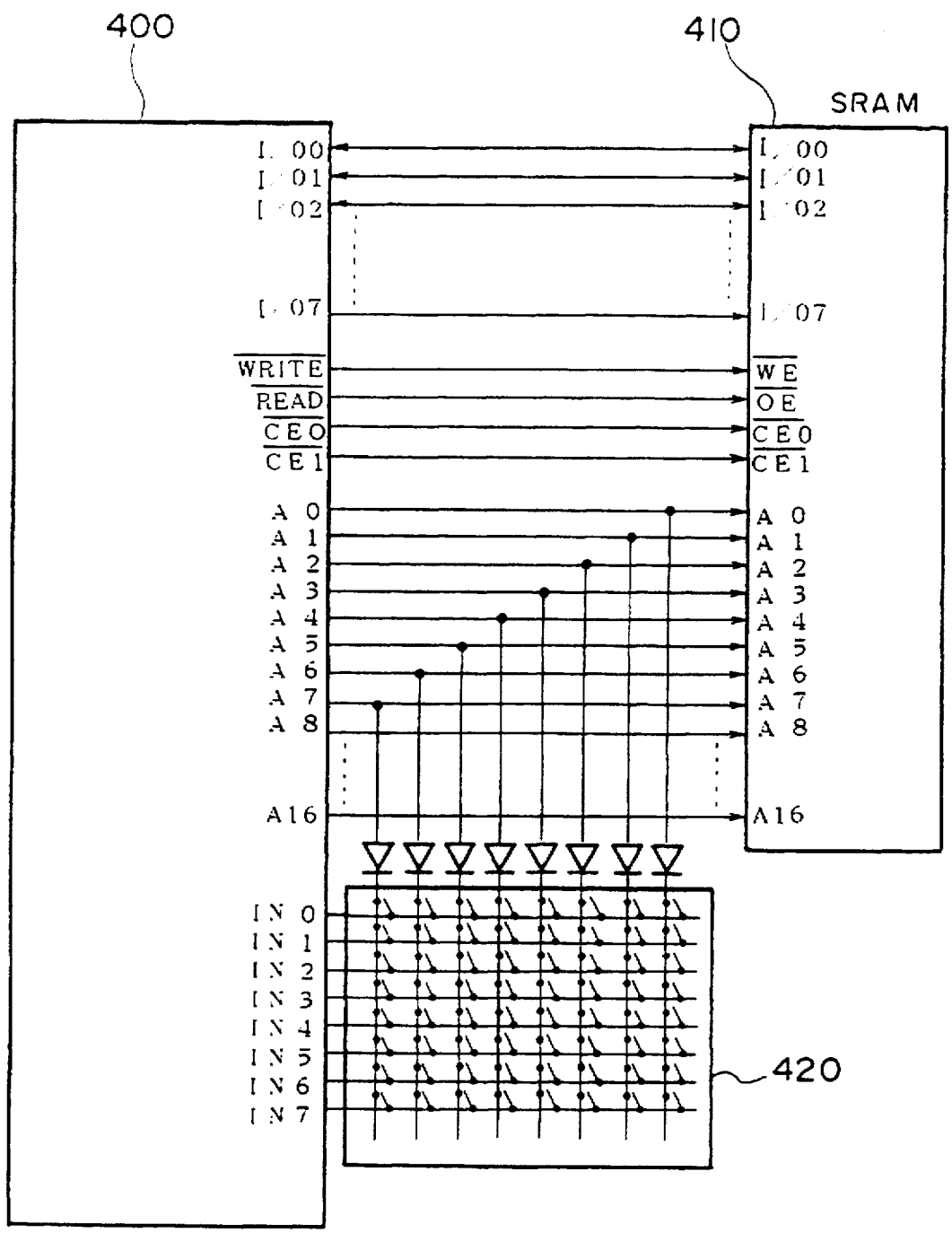
FIG. 8 is a diagram showing yet another example of an electronic device incorporating the single-chip microcomputer according to the present invention.

Furthermore, as shown in FIG. 8, the single-chip microcomputer 400 may be configured with connected as the first externally connected devices only a SRAM 410. In the example shown in FIG. 8 the chip select signals are configured with respect to the single SRAM 410 to enable two outputs.

In the above first and second embodiments, the memory address region is divided into four, one for internal memory and the remaining three for external memory, but this is not limiting, and there may be two or three internal memories and a single external memory. Furthermore, the system is configured with a single external memory having a single external memory address region, but this is not limiting, and the system may equally be configured with a single external memory having a plurality of external memory address regions.

Yet further again, the memory address region is divided into four, but this too is not limiting, and division into a power n of 2 (where n is a positive natural number) is also possible. In this case, specification of one of the divided memory address regions can be determined based on the most significant n bits of the address signals. At this time, the number m of the first output terminals will be required to satisfy m>n. The SRAM may have a 64K bit (8K byte) configuration.

Moreover, in the example adopted for description one machine cycle comprises four clock cycles, but one machine cycle may comprise any number, such as for example two clock cycles or six clock cycles. Furthermore, the input and output of display data signals to the display driver may be carried out through an input/output port.

As an electronic device having any or all of first, second, and third externally connected devices connected to the single-chip microcomputer of the present invention, application to a calculator, portable telephone, word processor, electronic notebook, electronic dictionary, or the like is possible.

What is claimed is:

1. A single-chip microcomputer to which is connected a plurality of externally connected devices any one of which is able to be selected by a chip select signal to execute program instructions, comprising:

a chip select signal output terminal which makes active and outputs a chip select signal selecting one of said plurality of externally connected device, wherein said plurality of externally connected devices are a plurality of external memory devices;

standby state setting means for outputting a standby state setting signal to temporarily halt the execution of said program instructions;

control means for changing said active chip select signal to be inactive based on said standby state setting signal from said standby state setting means, while the execution of said program instructions is halted temporarily;

a memory address signal output terminal outputting a memory address signal supplied to one of said plurality of external memory devices selected by said chip select signal; and an input and output terminal inputting and outputting a memory data signal to said one of said external memory devices according to said memory address signal from said memory address signal output terminal.

2. The single-chip microcomputer as defined in claim 1, further comprising microinstruction generating means for sequentially outputting microinstructions based on said program instructions wherein said standby state setting means comprises signal generating means for generating said standby state setting signal based on said microinstructions.

3. An electronic device using the single-chip microcomputer of claim 1.

4. A single-chip microcomputer to which is connected first externally connected devices and at least one second externally connected device supplies an address signal to one of said first externally connected devices selected by a chip select signal in accordance with the execution of program instructions, said single-ship microcomputer supplying a data signal to said at least one second externally connected device, comprising:

a first output terminal selectively outputting either of said address signal and said data signal;

a second output terminal making active and outputting a chip select signal which selects one of said first externally connected devices;

standby state setting means for outputting a standby state setting signal to temporarily halt the execution of said program instructions;

mode setting means for outputting a mode setting signal to establish either of a first mode in which said address signal is output from said first output terminal and a second mode in which said data signal is output from said first output terminal;

first control means for controlling the output of one of said address signal and said data signal from said first output terminal based on said mode setting signal from said mode setting means; and second control means for changing said chip select signal output from said second output terminal to be inactive based on said standby state setting signal from said standby state setting means, while the execution of said program instructions is halted temporarily.

5. The single-chip microcomputer as defined in claim 4, wherein said second control means comprises:

first gate means for making active and outputting said chip select signal in said first mode based on a set of highest order bits of said address signal and said mode setting signal; and second gate means for inputting the output of said first gate means and making said active ship select signal output from said second output terminal inactive based on said standby state setting signal from said standby state setting means, while the execution of said program instructions is halted temporarily.

6. The single-chip microcomputer as defined in claim 4, wherein said mode setting means establishes alternately and cyclically said first mode and said second mode.

7. The single-chip microcomputer as defined in claim 6, wherein said at least one second externally connected device includes a key matrix; and said key matrix carries out key input processing in said second mode based on said data signal output from said first output terminal.

8. The single-chip microcomputer as defined in claim 4, wherein at least one of said first externally connected device is an external memory device, said single-ship microcomputer further comprising an input and output terminal inputting and outputting a memory data signal to and from said external memory device according to said memory address signal from said memory address signal output terminal.

9. The single-chip microcomputer as defined in claim 8, further comprising:

third output terminals outputting read and write signals to said first externally connected devices when said first mode is established by said mode setting signal; and third control means for blocking the output of said read and write signals from said third output terminals when said second mode is established by said mode setting signal.

10. The single-chip microcomputer as defined in claim 9, wherein said third output terminals comprise a fourth output terminal outputting said read signal to said first externally connected devices when said first mode is established by said mode setting signal and a fifth output terminal outputting said write signal to said first externally connected devices when said first mode is established by said mode setting signal;

said second control means further comprises a gate control signal generating means for generating a gate control signal which blocks the output of one of said read signal output from said fourth output terminal and said write signal output from said fifth output terminal based on said mode setting signal when said second mode is established; and said third control means comprises:

first gate means for blocking the output of said read signal output from said fourth output terminal based on said gate control signal; and second gate means for blocking the output of said write signal output from said fifth output terminal based on said gate control signal.

11. An electronic device using the single-chip microcomputer of claim 4.

12. A single-chip microcomputer to which are connected at least one external memory, at least one key matrix, and at least one display means supplies a memory address signal to said at least one external memory and carries out read and write control of a memory data signal in accordance with the execution of program instructions, said single-chip microcomputer supplying a key scan signal to said at least one key matrix to control key input processing, said single-chip microcomputer supplying a data display signal to said at least one display means to control data display, comprising:

a first output terminal selectively outputting one of said memory address signal, said key scan data signal, and said display data signal;

an input and output terminal inputting and outputting said memory data signal to and from said at least one external memory device;

an output register storing one of said key scan data signal and said display data signal output from said first output terminal;

an input and output register storing said memory data signal input and output from said input and output terminal;

address generation means for generating said memory address signal;

a second output terminal making active and outputting a chip select signal which selects one of said at least one external memory and said at least one display means;

standby state setting means for outputting a standby state setting signal to temporarily halt the execution of said program instructions;

mode setting means for outputting a mode setting signal to establish either of a first mode in which said memory address signal is output from said first output terminal and a second mode in which either of said key scan signal and said display signal is output from said first output terminal;

first control means for controlling the output from said first output terminal of said memory address signal generated by said address generation means based on said mode setting signal in said first mode and the output from said first output terminal of either of said key scan signal and said display signal stored in said output register in said second mode; and second control means for changing said chip select signal output from said second output terminal to be inactive based on said standby state setting signal from said standby state setting means, while the execution of said program instructions is halted temporarily.

13. An electronic device using the single-chip microcomputer of claim 12.

* * * * *